United States Patent [19]
Gilbart-Smith

[11] 3,888,001
[45] June 10, 1975

[54] ADJUSTABLE CUTTER FOR CAKES AND PIES

[76] Inventor: David Mervyn Gilbart-Smith, 1651 Harwood St., Apt. 1105, Vancouver, Canada

[22] Filed: June 24, 1974

[21] Appl. No.: 482,016

[52] U.S. Cl............ 30/114; 30/279 R; 30/283
[51] Int. Cl............................................ A21c 15/04
[58] Field of Search.......... 30/114, 302, 283, 279 R

[56] References Cited
UNITED STATES PATENTS

| | | | |
|---|---|---|---|
| 1,117,453 | 11/1914 | Serrell | 30/114 |
| 1,467,395 | 9/1923 | Ross et al. | 30/114 X |
| 2,264,486 | 12/1941 | Smith et al. | 30/114 |
| 2,471,466 | 5/1949 | Weinberg | 30/114 |
| 2,555,690 | 6/1951 | Guerra | 30/114 |
| 2,560,271 | 7/1951 | Block | 30/114 X |

FOREIGN PATENTS OR APPLICATIONS
299,388  7/1917  Germany .................. 30/114

*Primary Examiner*—Al Lawrence Smith
*Assistant Examiner*—J. T. Zatarga

[57] ABSTRACT

A cutter has two blades. One end of each of the blades is connected to a pivot, so that by moving the blades in a circular arc and fixing them in a predetermined position along the arc, a predetermined angular relationship between the blades can be obtained. When a pipe or cake is be cut into equally sized pieces with no pie left over, one of the blades is set at that position along a calibrated scale whose calibration corresponds to the number of slices desired. Thus, the proper angular relationship between the two blades is set, and the user can divide the pie or cake evenly.

1 Claim, 3 Drawing Figures

PATENTED JUN 10 1975　　　　　　　　　　3,888,001

ADJUSTABLE CUTTER FOR CAKES AND PIES

SUMMARY OF THE INVENTION

My invention is directed towards improvements in the art of cutting pies and cakes. More specifically, it is the object of my invention to provide a cutter with which a pie or cake or any similarly shaped food can be evenly divided into any predetermined number of slices.

To this end, I construct two knife-edged blades. I connect each blade to a handle, and I connect the ends of the blades remote from the handle to a common pivot, allowing the angular orientation between the blades to be varied by moving the movable blade with respect to the fixed one. I then provide a calibrated means for fixing the relative angular orientation of the blades. Thus, when I wish to divide a pie or cake into $n$ equal slices, I set one of the blades at that orientation whose calibration is $n$. Then, by depressing the cutter into the pie or cake with the pivot aligned with the center of the pie or cake, I can cut equal sized wedges out of the pie by pressing the blades therein and rotating the pie in a circle, using previously made cuts as reference points for later cuts.

DETAILED DESCRIPTION OF PREFERRED EMBODIMENTS

Figure 1:
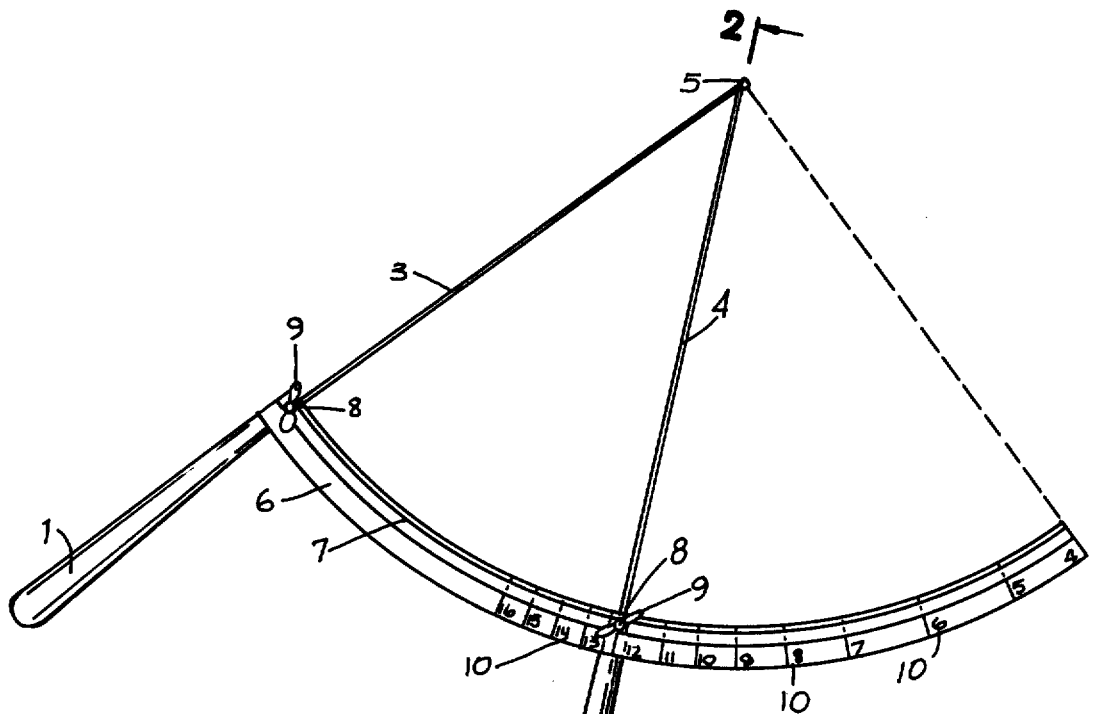
FIG. 1 is a top view of my invention.
Figure 2:
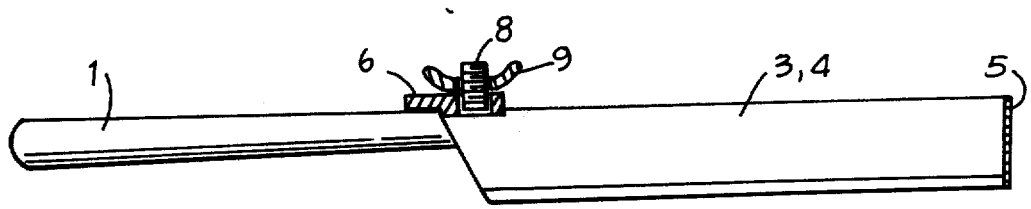
FIG. 2 is a side view of my invention.
Figure 3:
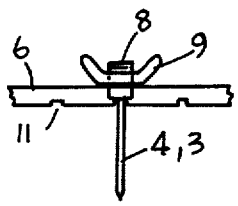
FIG. 3 is an enlarged detail view thereof.

Referring now to the drawings, two roughly cylindrical handles 1 and 2 are disposed at the longitudinal extremities of elongated knife blades 3 and 4. The longitudinal extremities of the two knife blades are connected by a pivot 5. A member 6 is disposed above the handles and is constructed from metal plate and takes the form of a section of a ring which subtends 90° of arc (or more if desired). In this member 6 a slot 7 is disposed, the slot defining a circular arc which subtends 90° of arc and has a center of curvature coincident with the center of curvature of the member. Member 6 also has radially disposed bottom slots 11 into which blades 3 and 4 can be detachably disposed and locked. Screws 8 are attached to each of the handles, and extend through the slot. Wing nuts 9, disposed above the member, are threaded on the screws and hold the blades fixed with respect to the member and thus with each other. When one of the blades is fixed at the extreme left hand position on the member as shown in FIG. 1 and the other one is aligned with one of the integral calibrations 10 printed on the member, then the orientation of the blades will be such as to cut a cake or pie into exactly the number of slices shown on the calibration.

While the invention has been described with detailed reference to the drawings, the protection sought is to be limited only by the terms of the claims which follow.

I claim:
1. A device for cutting pies, cakes or the like into a predetermined number of slices and comprising:
   first and second horizontally elongated cutting blades lying in vertical planes with bottom disposed horizontal cutting edges;
   first and second horizontally elongated handles, each handle being secured to one end of a corresponding blade;
   means pivotally securing the other ends of the blades together;
   first and second vertical threaded bolts, each bolt being secured at its bottom end to the corresponding handle and extending upward from the one end of the corresponding blade;
   a horizontal flat curved member defining a circular arc, said member having a curved slot also defining a circular arc, said slot and said member having the same center of curvature, the bottom of said member having spaced radially extending straight recesses, said bolts extending upwards through the curved slot whereby the blades can be rotated in the slot about the means and said one end of each blade can be disposed in any one of said recesses; and
   first and second wing nuts, each nut being secured to the top end of a corresponding bolt and overlying said member.

* * * * *